United States Patent Office 3,266,239
Patented August 16, 1966

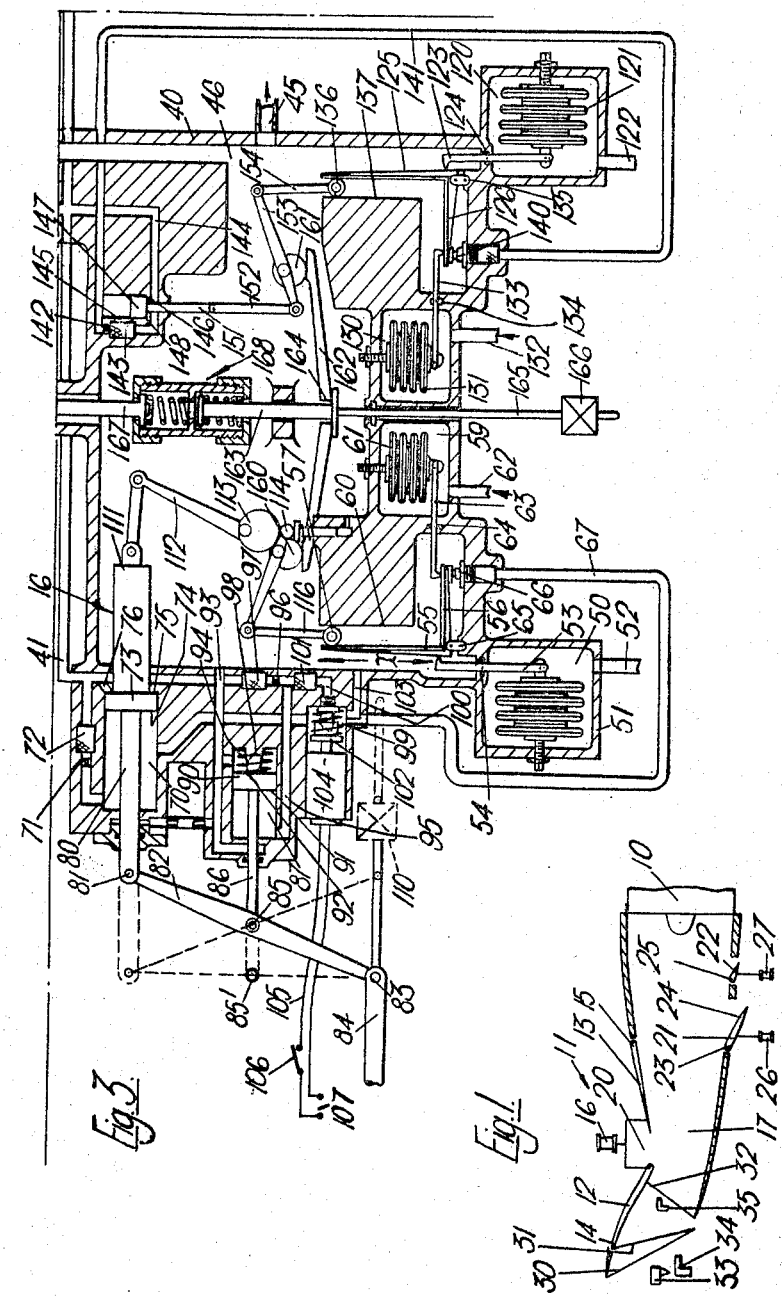

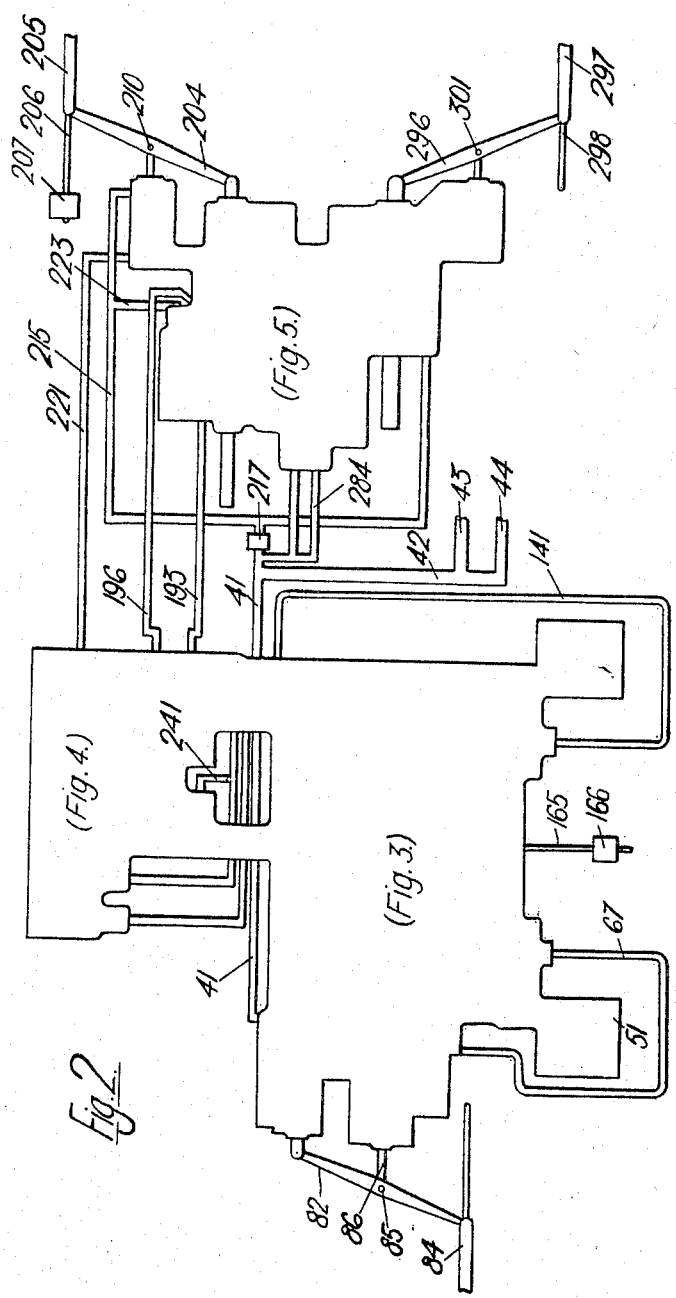

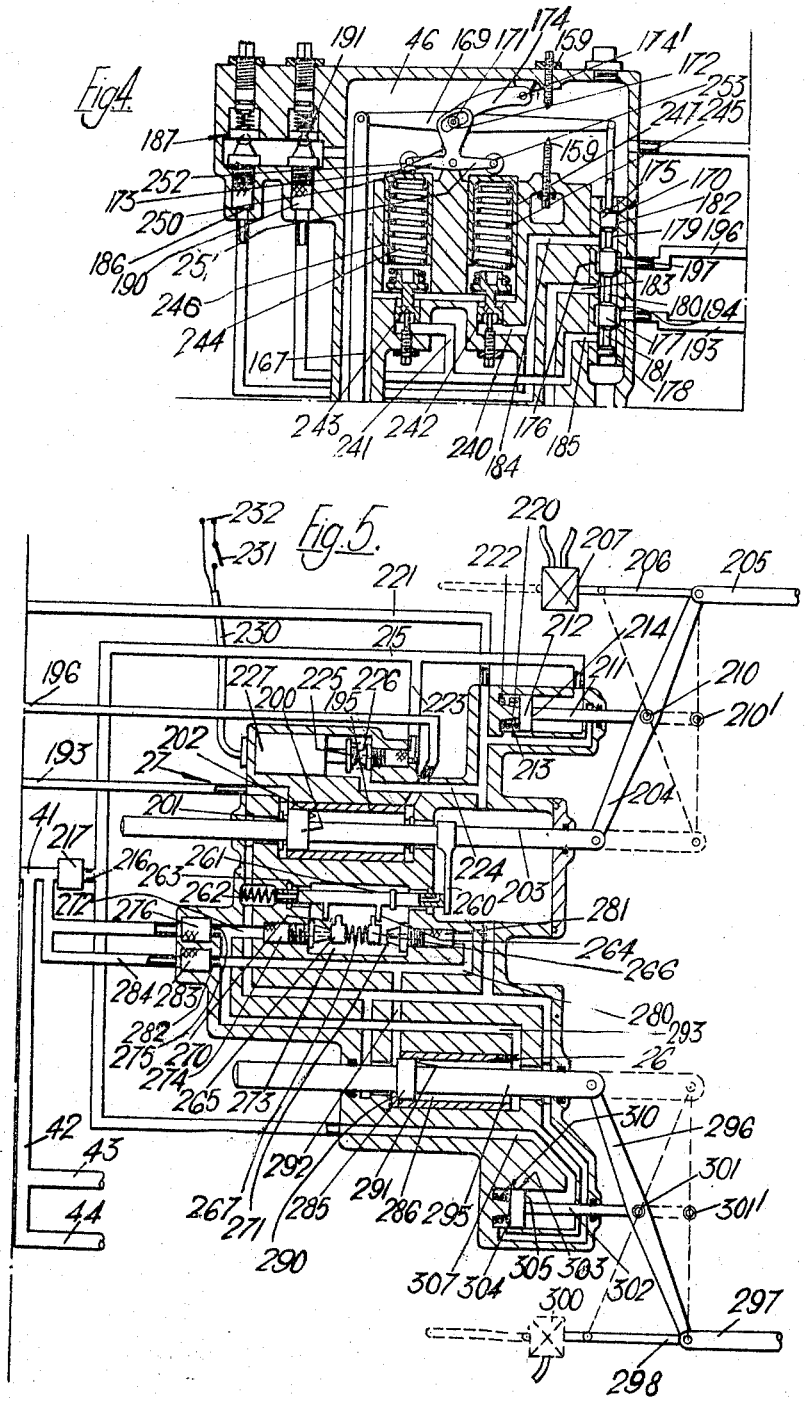

3,266,239
APPARATUS FOR CONTROLLING THE POSITION OF A PART OR PARTS
James Reginald Simpson, Derby, and Norman Roberts, Hucknall, England, assignors to Rolls-Royce Limited, Derby, England, a company of Great Britain
Filed Dec. 14, 1964, Ser. No. 417,955
Claims priority, application Great Britain, Dec. 24, 1963, 51,018
19 Claims. (Cl. 60—35.6)

This invention concerns control apparatus for controlling fine and coarse control members.

According to the present invention, there is provided control apparatus comprising first and second rams which are respectively arranged to control fine and coarse control members, the second ram having a piston opposite sides of which are respectively open to the pressures in first and second passages which are adapted to be supplied with a pressure fluid, said first and second passages being respectively provided with first and second vent valves opening of which causes a reduction of pressure in the respective passages, and a movable member which is movable by the first ram and which has two abutments which are respectively engageable with the first and second vent valves, the movable member being movable between a mid-position in which it engages neither vent valve and two further positions in which it respectively engages and effects opening of one or other vent valve, the arrangement being such that if the first ram is disposed adjacent the end of its travel in the direction in which it makes the five control members exercise maximum control it causes the movable member to effect opening of the first vent valve and so bring the coarse control member into operation, if the first ram should thereafter move in the opposite direction the movable member will move to the said mid-position in which the coarse control member will be stationary, and if the first ram continues to move in the said opposite direction, the movable member will then effect opening of the second vent valve so as to move the coarse control member towards its inoperative position.

The said fine and coarse control members may be respectively constituted by a spill flap and a dump flap in a supersonic intake. Thus, the first and second passages may communicate with a common pressure fluid source by way of first and second restrictions respectively, the first and second restrictions having sizes such as to cause the dump flap to open at a substantially greater speed than it closes.

At least one of said rams may comprise a control piston which is provided with a piston rod, a lever spaced parts of which are respectively pivotally connected to the piston rod and to an output member which is connected to a said control member, said lever being mounted on a movable pivot, means for subjecting opposite sides of the control piston to different and relatively variable pressures so as to move the output member between two limiting positions, means for sensing the position of the output member, and means for moving the movable pivot into and out of a position in which the output member is disposed in a predetermined said limiting position respective of what may be the position of the control piston.

The means for moving the movable pivot may comprise a ram having a ram piston, means for subjecting opposite sides of the ram piston to first and second pressures which respectively urge the ram piston to maintain the movable pivot away from and in the said position thereof, and means for releasing the said first pressure. The ram piston is preferably a differential area piston having a larger area side exposed to the said second pressure and a smaller area side exposed to the said first pressure. The first and second pressures are preferably fluid pressures, the larger area side of the ram piston also being engaged by a spring.

The means for releasing the first pressure may comprise a valve which is urged open by a spring and which is closed on energisation of a solenoid.

The control piston may be provided with oppositely facing pressure surfaces of equal area, there being provided sources of relatively high and relatively low pressure, and a change-over valve for subjecting one pressure surface to a selected one of said pressures and the other pressure surface to the other pressure.

A change-over valve may control the supply of pressure fluid to the first ram, variable-responsive means being arranged to adjust the position of said change-over valve in dependence upon the value of a variable, and feed back means being provided for adjusting the change-over valve back towards a predetermined position at a speed proportional to the speed of operation of the first ram.

The first ram may have first and second pressure fluid ducts respectively communicating with opposite ends thereof, high and low pressure ducting being provided, the said change-over valve being movable to connect a selected one of said first and second pressure fluid ducts with the high pressure ducting at the same time as the other of said pressure fluid ducts is connected to the low pressure ducting.

The low pressure ducting may contain at least one restrictor therein the pressure drop across which is substantially linearly proportional to the speed of flow therethrough, the said feed back means being adjusted by the said pressure drop.

The variable responsive means are preferably connected to the change-over valve by a linkage which includes a lever arm having a movable fulcrum, the feed back means being arranged to adjust the position of the fulcrum.

The low pressure ducting may comprise two low pressure ducts each of which has a said restrictor therein, a cam mechanism being provided for effecting adjustment of said movable fulcrum, said cam mechanism being positioned by the relative pressure drops at any moment across the two restrictors.

The variable responsive means may be adapted to sense pressures indicative of the position of a final shock wave in the intake.

Accordingly, the apparatus may comprise first positioning means for positioning a first member in dependence upon the quotient of reverse pitot pressure and local pitot pressure, second position means for positioning a second member in dependence upon the quotient of local pitot pressure and local static pressure, and a third member which is connected to the said linkage and which is also connected to the said first and second members through the intermediary of cams.

Each of the first and second positioning means may comprise an L-shaped beam having a movable fulcrum, the arms of each respective beam being respectively subjected to the respective pressures whose quotient is to be obtained, the pressures being arranged to subject the respective beam to moments of opposite sense, and means connected to the respective first and second member, for adjusting the position of the movable fulcrum of the respective beam to produce equilibrium thereof.

The said second positioning means may control the positions of parts of a ramp, the said ramp forming part of the said intake.

The invention is illustrated, merely by way of example,
FIGURE 1 is a diagrammatic sectional view of a gas turbine engine supersonic intake.
FIGURE 2 is a diagrammatic view of apparatus for controlling the positions of certain parts of the said supersonic intake, and FIGURES 3–5 are sectional views showing parts of the structure of FIGURE 2 on a larger scale.

Terms such as "left," "right," "upper" and "lower," as used in the description below, are to be understood to refer to directions as seen in the drawings.

Referring first to FIGURE 1, a gas turbine forward propulsion engine 10, for use on a supersonic aircraft, is provided with a supersonic intake 11.

The upper surface of the intake 11 is provided with a ramp having parts 12, 13 which are respectively pivoted at 14, 15. The parts 12, 13 are arranged to be moved by a common ram 16. Actuation of the ram 16 causes the ramp parts 12, 13 to be moved towards or away from each other so as to vary the effective area of the throat 17 of the intake. The parts 12, 13 are also movable into and out of a position in which there is a gap 20 between them through which a throat bleed may be taken.

The lower surface of the intake 11 is provided with a dump flap 21 and a spill flap 22. The dump flap 21 is provided adjacent its leading and trailing edges with pivot points 23, 24 respectively about which it may be pivoted. The spill flap 22 may however be pivoted only about a pivot point 25 adjacent its leading edge.

Rams 26, 27 are provided for respectively effecting pivotal movement of the dump flap 21 and the spill flap 22 and means (not shown) are provided for permitting the pivot of the dump flap 21 to be moved from its pivot point 23 to its pivot point 24, or vice versa.

During supersonic cruise, three shock waves 30, 31, 32 are generated, of which the shock wave 32 is a final shock wave. The movement of the ramp parts 12, 13 controls the supersonic part of the intake, i.e. the part upstream of the throat 17, by focusing the shock waves 30–32.

Opening and closing of the dump flap 21 and spill flap 22 is used to match the flow through the intake 11 with that through the engine 10. The spill flap 22 is used as a fine control in this respect, whilst the dump flap 21 is used as a coarse control. Thus, the dump flap 21 is employed, for example, in the case of engine flame-out during supersonic flight.

The dump flap 21, is, moreover, used to provide extra flow at speeds below, say Mach 0.5 and in this position is pivoted (by manually operable means, not shown) about the pivot point 24. At speeds between, say Mach 0.5 and Mach 1.6, the dump flap 21 is maintained fully closed and, during this condition, the pivot is passed (by means not shown) between the points 24, 23. At speeds between, say, Mach 1.6 and Mach 2.2, the dump flap 21 is opened by virtue of the ram 26 effecting pivotal movement thereof about its pivot point 23.

In supersonic flight, movement of the dump flap 21 and spill flap 22 alters the position of the final shock wave 32, so that, by opening and closing these flaps, it is possible to maintain the final shock wave 32 in the position shown. That is to say it is possible to prevent this final shock wave from moving either upstream or downstream of the intake.

It is thus necessary in flight constantly to adjust the positions of the ramp parts 12, 13 in accordance with local Mach number and it is also necessary to adjust the positions of the flaps 21, 22 in accordance with the position of the final shock wave 32.

The value of the local Mach number is derived from the pressures sensed by a forwardly facing Pitot tube 33, which senses a pressure $P_S$, i.e. local pitot pressure, and by a sideways facing pitot tube 34, which senses a pressure $pL$, i.e. local static pressure. The Pitot tubes 33, 34 are disposed adjacent the forward end of the intake 11. The local Mach number can be shown to be related to the quotient $P_S/pL$.

A Pitot tube 35 is disposed adjacent the desired position of the final shock wave 32, so that movements of the final shock wave 32 are sensed by the Pitot tube 35.

The Pitot tube 35 is rearwardly facing and thus senses a pressure $P_{rp}$ i.e. reverse pitot pressure.

In FIGURES 2–5, there is shown apparatus for effecting the necessary movement of the ramp parts 12, 13 and of the flaps 21, 22.

Referring to FIGURE 3, a housing 40 (e.g. of aluminum) contains a high pressure fluid conduit 41 which is supplied with high pressure fluid (e.g. aircraft fuel or a hydraulic liquid) from a main conduit 42 (FIG. 5). The main conduit 42 is itself connected by conduits 43, 44 to two separate sources of high pressure fluid supply.

The high pressure supplies to the conduits 43, 44 are provided by one or more pumps (not shown) whose low pressure side communicates (e.g. by way of a header tank, not shown) with a low pressure conduit 45. The low pressure conduit 45 itself communicates with a low pressure chamber 46 within the housing 40, whereby the fluid in the chamber 46 is at low pressure.

An air or oil filled bellows chamber 50, which contains an evacuated bellows 51, communicates with a pipe 52. The pressure in the pipe 52 is arranged to be the same as, or functionally related to, the pressure $pL$ sensed by the Pitot tube 34. Means (not shown) may be provided for preventing temporary fluctuations in the pressure $pL$ sensed by the Pitot tube 34 from being transmitted to the pressure fluid within the bellows chamber 50.

The evacuated bellows 51 is directly bolted (i.e. without the use of a pivot) to an arm 53 which extends through the wall of the housing 40 and so into the low pressure chamber 46. The arm 53 is both pivotally mounted in and sealed to the wall of the housing 40 by a sealing device 54.

Since the arm 53 is directly bolted to the bellows 51, the connection between them is friction-free, this being possible because only relatively small movements are involved, and these will be taken up by flexure of the bellows 51.

The sealing device 54 must not only provide a complete seal between the bellows chamber 50 and the low pressure chamber 46, but must have a low effective rate. The arm 53 may be pivoted within the sealing device 54 on ball races (not shown), the sealing member of the said device being arranged to lie with its effective centre, under pressure, exactly on the point of rotation of the arm 53.

The bellows 51 is arranged via the arm 53 to apply to one limb 55 of an L-shaped beam 55, 56, a load which is proportional to the absolute pressure $pL$ surrounding the bellows 51. The arm 53 preferably engages the limb 55 through a virtually frictionless roller (not shown).

An air or oil filled bellows chamber 59, within which is mounted an evacuated bellows 61, communicates with a pipe 62. The pipe 62 is arranged to receive a pressure which is the same as, or is functionally related to, the pressure $P_S$ sensed by the Pitot tube 33. The bellows chamber 59 may be arranged not to be subjected to temporary fluctuations in the pressure $P_S$.

The bellows 61 is directly bolted to an arm 63 which extends through the wall of the housing 40 and so into the low pressure chamber 46. The arm 63 is both pivotally mounted in the said wall and is sealed thereto by a sealing device 64. The arm 63 is arranged, through a virtually frictionless roller (not shown), to apply to the limb 56 of the L-shaped beam 55, 56, a load which is proportional to the absolute pressure $P_S$ which surrounds the bellows 61.

The L-shaped beam 55, 56 is loosely mounted within the low pressure chamber 46 by a mounting member 65 which permits some free non-pivotal movement of the L-shaped beam 55, 56. A roller 57 engages both the limb 55 and a hard flat surface 60 of the housing 40.

The roller 57 is arranged, by means described below, to be moved up and down the surface 60 and in so moving provides a movable fulcrum for the L-shaped beam 55, 56. The roller 57 is arranged to maintain the movable fulcrum in a position in which the L-shaped beam 55, 56 is in equilibrium. Accordingly, since the mounting means 65 offers no reaction to the force from the pressure $pL$, the L-shaped beam 55, 56 is, at equilibrium, subjected to two moments of opposite sense through the arms 53, 63.

If the distance between the roller 57 and the point at which the arm 53 contacts the limb 55 is given as $x$, then $x$ equals $aP_S/pL$, where $a$ is a constant. That is to say, the position of the roller 57 will be represenative of the value of the quotient $P_S/pL$, this quotient being itself representative of the local Mach number.

The limb 56, at its end remote from the limb 55, carries a half-ball valve 66 which provides a valve-controlled vent from a pressure fluid conduit 67 to the low pressure chamber 46, movement of the valve 66 adjusting the pressure in the pressure fluid conduit 67. The end of the pressure fluid conduit 67 remote from the half-ball valve 66 communicates via a cylinder 70, a restriction 71, and a filter 72, with the high pressure fluid conduit 41. The cylinder 70 forms part of the ram 16.

Slidably mounted within the cylinder 70 is a differential area control piston 73 which is urged towards the left by a spring (not shown). The control piston 73 is provided on its left and right-hand sides with pressure surfaces 74, 75 respectively, of which the pressure surface 74 is substantially greater in area than the pressure surface 75. The pressure surface 74 is thus subjected to the pressure in the pressure fluid conduit 67, while the pressure surface 75 is subjected, by way of a pressure fluid conduit 76, to the pressure of the fluid in the high pressure fluid conduit 41. The control piston 73 will thus move in accordance with variations in the pressure fluid conduit 67 and these variations will themselves be caused by variations in the value of the quotient $P_S/pL$, since such variations will cause movement of the L-shaped beam 55, 56 and hence of the half-ball valve 66.

The control piston 73 is provided with a piston rod 80 which is pivotally connected at 81 to one end of a lever 82. The lever 82 is pivotally connected at its other end 83 to an output member 84 which, by means not shown, controls the positions of the ramp parts 12, 13.

The lever 82 is mounted on a movable pivot 85 which is carried by a piston rod 86 of a ram 87. The piston rod 86 carries a differential area ram piston 90. The ram piston 90 has pressure surfaces 91, 92 on its left and right hand sides respectively, the pressure surface 92 being of greater area than the pressure surface 91.

The pressure surface 92 is subjected, via a passage 93, to the low pressure prevailing within the low pressure chamber 46, the said low pressure urging the ram piston 90 towards the left. The surface 92 is also urged towards the left by a spring 94. The pressure surface 91 is subjected to the high pressure within a pipe 95, the latter communicating by way of a restriction 96 and a filter 97 with the high pressure fluid conduit 41. The said high pressure urges the ram piston 90 towards the right and towards contact with a stop 98.

One end of a passage 100 communicates by way of a filter 101 with the pipe 95, the opposite end of the passage 100 communicating, when a half-ball valve 102 is open, with a passage 103 leading to the low pressure chamber 46.

The half-ball valve 102 is urged towards the open position by a spring 99, but is maintained in the closed position on energisation of a solenoid 104. The solenoid 104 is connected in an electrical circuit 105 which contains a selector switch 106 and which is supplied with current from a 28 volt D.C. supply source 107.

A ramp monitoring transducer 110 is arranged, by means not shown in detail, to provide a signal representative of the position of the ramp parts 12, 13.

The ram piston 90 is normally maintained in the position shown in FIGURE 2. In this position, the pivot 85 will remain in the position indicated in full lines and will therefore permit the output member 84 to be moved by the control piston 73 between two limiting positions in which the ramp parts 12, 13 are respectively raised and lowered.

If, however, there should be a loss of hydraulic pressure in the system, the pressure acting on the pressure surface 91 will fall. Since, however, the pressure surface 91 is smaller in area than the pressure surface 92, the ram piston 90 will be forced towards the left both by the difference in the fluid pressures acting on it and also by the force of the spring 94. This will cause the movable pivot 85 to move to a position 85'. When the movable pivot is at the position 85', however, the output member 84 will always be maintained in the position in which the ramp parts 12, 13 are lowered no matter what may be the position of the control piston 73. Thus, on failure of the hydraulic supplies to the apparatus shown in FIGURE 2 a fail-safe arrangement is provided in which the ramp parts 12, 13 will in all circumstances become lowered.

If, on the other hand, there should be a failure in some other part of the apparatus, this will be detected by the ramp monitoring transducer 110 and will be indicated by a warning light or the like on the flight deck of the aircraft. The pilot will then open the switch 106 whereby the solenoid 104 will be de-energised, the half-ball valve 102 will open, and the pressure in the passage 100 will fall. This will produce a fall in the pressure acting on the pressure surface 91 whereby the ram piston 90 will be forced towards the left so as to place the movable pivot 85 in the position 85' in which the ramp parts 12, 13 will be lowered irrespective of the position of the control piston 73.

Similarly, if the electrical supply to the solenoid 104 should fail, the ramp parts 12, 13 will be maintained in their lowered position.

Since the pressure surface 74, which is exposed to the pressure in the pressure fluid conduit 67, is of larger area than the pressure surface 75, which is exposed to the pressure in the high pressure fluid conduit 41, if there should be a failure in the hydraulic system the control piston 73 will be urged towards the right, i.e. towards the position in which the output member 84 maintains the ramp parts 12, 13 in the lowered position. This therefore provides yet a further "fail-safe" feature.

The control piston 73 has a piston rod 111 which is connected by a linkage 112 to effect rotation of a cam 113. The cam 113 engages a cam follower 114 which is carried at one end of a lever 115 whose other end is pivotally connected to an arm 116 which carries the roller 57. The cam 113 introduces a desired relationship between the value of the quotient $P_S/pL$ and the degree of movement effected by the control piston 73. Such a cam 113 must be provided because the roller 57 which provides the movable fulcrum of the L-shaped beam 55, 56 must follow the quotient $P_S/pL$ linearly whereas the control piston 73 must effect movement of the output member 84 and hence of the ramp parts 12, 13 in accordance with a non-linear function of the local Mach number.

Thus if, for example, the pressure $P_S$ should increase, with the result, of course, that the local Mach number will also increase, the equilibrium of the L-shaped beam 55, 56 will be disturbed and the half-ball valve 66 will move toward the closed position. This will cause a rise in the pressure in the pressure fluid conduit 67 which will cause the control piston 73 to move towards the right so as to effect lowering of the ramp parts 12, 13. At the same time the rightward travel of the control piston 73 will cause the roller 57 to move further away from the arm 53 until the L-shaped beam 55, 56 is restored to its state of equilibrium. When this occurs, the half-ball valve 66 will effect its normal predetermined control of flow from the pressure fluid conduit 67 to the low pressure chamber 46.

Similarly, if there should be an increase in the pressure $pL$ without a corresponding increase in the pressure $P_S$, the balance of the L-shaped beam 55, 56 will be disturbed so as to cause opening movement of the half-ball valve 66 whereby to reduce the pressure in the pressure fluid conduit 67. This reduction of the pressure in the pressure fluid conduit 67 causes the control piston 73 to move towards the left whereby to effect raising of the ramp parts 12, 13. At the same time, the roller 57 becomes pushed inwardly towards the arm 53 with the result that the L-shaped beam 55, 56 is restored to its equilibrium position.

An air or oil filled bellows chamber 120, which contains an evacuated bellows 121, communicates with a pipe 122 which receives a pressure functionally related to the pressure $pL$. As in the case of the bellows chamber 50, the bellows chamber 120 may be arranged not to be subjected to temporary fluctuations in the pressure $pL$. The pressure $pL$ is derived from the Pitot tube 34.

An arm 123, which is directly secured to the bellows 121, extends through the wall of the housing 40 and into the low pressure chamber 46. The arm 123 is pivotally mounted in and sealed to the wall 46 by a sealing device 124. The arm 123, via a virtually frictionless roller, not shown, applies a force to one limb 125 of an L-shaped beam 125, 126.

An air or oil filled bellows chamber 130, which contains an evacuated bellows 131, communicates with a passage 132 which receives a pressure functionally related to the pressure $Prp$ sensed by the Pitot tube 35.

An arm 133 is directly secured to the evacuated bellows 131 and extends through a wall of the housing 40 and into the low pressure chamber 46. The arm 133 is pivotally mounted in and sealed to the said wall by means of a sealing device 134. The arm 133 acts via a virtually frictionless roller, not shown, on the limb 126 of the L-shaped beam 125, 126.

It will be noted that the bellows 61, 131 are substantially smaller than the bellows 51, 121. In order to achieve the sensitivity required, it has been found convenient to make the bellows 61, 131 of a cross-sectional area of 1.2 square inches, whilst the bellows 51, 121 may be given a cross-sectional area of 3.3 square inches.

The L-shaped beam 125, 126 is loosely mounted within the low pressure chamber 46 by means of a mounting member 135 which permits some free non-pivotal movement of the beam.

A roller 136 engages a hard flat surface 137 of the chamber 46 and also engages the limb 125 of the L-shaped beam 125, 126. The roller 136 is movable, by means described below, along the surface 137 so as to provide a movable fulcrum of the L-shaped beam 125, 126. As will be appreciated the beam 125, 126 is subjected to two moments of opposite sense, so that when the roller 136 is in the position in which the beam 125, 126 is in equilibrium, the position of the roller 136 is representative of the quotient $Prp/pL$ and therefore representative of the position of the final shock wave 32.

The limb 126 of the L-shaped beam 125, 126 carries, at its end adjacent the arm 133, a half-ball valve 140 which forms part of a valve-controlled vent from a pressure fluid conduit 141 to the low pressure chamber 46. The pressure fluid conduit 141 communicates by way of a restriction 142 and a filter 143 with a high pressure fluid conduit 144 which itself communicates with the high pressure fluid conduit 41.

A cylinder 145 has a control piston 146 of differential area slidably mounted therein. The control piston 146 has upper and lower pressure surfaces 147, 148 respectively, the pressure surface 147 being of greater area than the pressure surface 148.

The pressure surface 147 is subjected to the pressure in the pressure fluid conduit 141 while the pressure surface 148 is subjected to the pressure in the high pressure fluid conduit 144. Thus, any variation in the value of the quotient $Prp/pL$ will produce a variation in the pressure in the pressure fluid conduit 141 and will therefore cause movement of the control piston 146 in sympathy.

The control piston 146 is connected by a piston rod 151 and a link 152 to one end of a 1:2 ratio lever 153 whose other end is connected by a link 154 to the roller 136. As will be appreciated, variation in the pressure in the pressure fluid conduit 141, consequential upon variation in the value of the quotient $Prp/pL$, will cause movement of the roller 136 along the surface 137 so as to alter the fulcrum of the L-shaped beam 125, 126 whereby to restore the latter to equilibrium.

Rotation of the levers 115, 153 effects rotation of cams 160, 161 respectively, these cams respectively engaging opposite sides of a cross-head 162.

The position of the cross-head 162 is thus indicative of a comparison between the quotient $P_S/pL$, as represented by the position of the roller 57, and the quotient $Prp/pL$, as represented by the position of the roller 136. In other words, the position of the cross-head 162 represents a comparison between the pressure sensed by Pitot tube 35 and the local Mach number. Thus, the cross-head 162 will move if the position of the final shock wave 32 also moves.

A rod 163 extends freely through an opening 164 in the cross-head 162. The rod 163 is connected by a rod 165 to a spill flap error signal transducer 166.

The rod 163 is connected to a rod 167 by a lost motion connection 168. The rod 167 constitutes a link which is pivotally connected to one end of a lever arm 169 (FIG. 4) whose opposite end is pivotally connected to a change-over or spool valve 170.

The lever arm 169 has a fulcrum constituted by a pivot 171 which is mounted within a cam track 172 in a plate 173. The pivot 171 is carried by an arm 174 which is pivotally connected at 174' to the wall of the housing 40. Adjustable stops 159 limit the possible travel of the lever arm 169.

The spool valve 170 is provided with lands 175, 176, 177, 178, which are spaced from each other by reduced diameter portions 179, 180, 181 respectively.

The spool valve 170 is slidably mounted in a valve body 182, opposite ends of which are open to the pressure in the low pressure chamber 46.

The reduced diameter portion 180 communicates with high pressure ducting 183 which itself communicates with the high pressure fluid conduit 41.

Ducts 184, 185 respectively communicate with the reduced diameter portions 179, 180. The duct 184 communicates by way of a filter 186 and a restrictor 187, with the low pressure chamber 46 while the duct 185 communicates, by way of a filter 190 and a restrictor 191, with the low pressure chamber 46. The restrictors 187, 191 are such that the pressure drops across each of them is substantially linearly proportional to the speed of fluid flow therethrough.

A pressure fluid duct 193 communicates at its left hand end with an annular chamber 194 which, in the position of the parts shown in FIGURE 4, annularly surrounds the land 177. The right hand end of the pressure fluid duct 193 communicates with the left hand end of a cylinder 195 (FIG. 5), the latter forming part of the ram 27.

The left hand end of a pressure fluid duct 196 communicates with an annular chamber 197 which, in the position of the parts shown in FIGURE 4, annularly surrounds the land 176. The right hand end of the pressure fluid duct 196 communicates with the right hand end of the cylinder 195.

Mounted in the cylinder 195 and slidable therein is a control piston 200 which is provided with oppositely facing pressure surfaces 201, 202 of equal area.

In the position of the parts shown in FIGURES 4 and 5, the control piston 200 will remain stationary within the cylinder 195. If, however, the spool valve 170 is raised, the pressure in the high pressure ducting 183 will be transmitted to the pressure fluid duct 196 so as to urge the control piston 200 towards the left. This will cause pressure fluid to be forced out through the pressure fluid duct 193 which will, at that time, be in communication with the duct 185, whereby there will be a flow through the restrictor 191 to the low pressure chamber 46.

If, on the other hand, the spool valve 172 is lowered, the high pressure in the high pressure ducting 183 will be transmitted to the pressure fluid duct 193, whereby the control piston 200 will move towards the right. This will force fluid to be forced out through the pressure fluid duct 196 which will, at that time, be in communication with the duct 184. The flow through the duct 184 will pass out through the restrictor 187 to the low pressure chamber 46.

The control piston 200 is mounted on a piston rod 203 which is pivotally connected to one end of a lever 204. The other end of the lever 204 is pivotally connected to an output member 205, movement of which effects movement of the spill flap 22.

The output member 205 is connected by a rod 206 to a spill flap transducer 207 which indicates the position of the spill flap 22. The transducer 207 may be arranged to provide a signal for the correction of engine speed.

The lever 204 has a pivot 210 which is carried by a rod 211 of a ram piston 212. The ram piston 212 is a differential area piston having pressure surfaces 213, 214 of relatively greater and relatively smaller area.

The pressure surface 214 is subjected to high pressure by way of a high pressure passage 215 which communicates with the high pressure fluid conduit 41 through a restriction 216 and a filter 217. The high pressure to which the pressure fluid surface 214 is subjected tends to seat the ram piston 212 on a stop 220. The pressure fluid surface 213 is open to the low pressure prevailing within the low pressure chamber 46 by way of a low pressure passage 221. A spring 222 urges the ram piston 212 towards the right.

One end of a high pressure passage 223 communicates with the high pressure passage 215. The end of the high pressure passage 223 remote from the high pressure passage 215 communicates with a low pressure passage 224 by way of a valve 225, the low pressure passage 224 communicating with the low pressure passage 221. The valve 225 is urged towards the open position by spring 226 and is closed on energisation of a solenoid 227. The solenoid 227 is connected in an electrical circuit 230 which includes a selector switch 231 and which is connected across a 28 volts D.C. supply source 232.

As will be appreciated, if there is a drop in the pressure in the high pressure passage 215 either caused by a failure in the hydraulic system or by deliberate de-energisation of the solenoid 227 (e.g. as a result of the flight crew noticing, from the indication provided by the spill flap transducer 207, that the spill flap 21 is not in the desired position) then the pressure to which the pressure surface 214 is subjected will fall and the pressure difference across the ram piston 212, together with the force of the spring 222, will force the rod 211 towards the right whereby the pivot 210 will move to a position 210'. In the position 210', the output member 205 will maintain the spill flap 22 in the fully open (and therefore safe) position irrespective of what may be the position of the control piston 200.

The ducts 184, 185 (FIG. 4) respectively communicate by way of ducts 240, 241, with the lower sides of pistons 242, 243 respectively.

The pistons 242, 243, by way of springs 244, 245, respectively control the positions of pistons 246, 247. The plate 173 has arms 250, 251, which respectively carry rollers 252, 253, which bear on the pistons 246, 247 respectively.

The upper surfaces of the pistons 242, 243, are subjected to the low pressure prevailing in the low pressure chamber 46. Thus the pistons 242, 243, respectively sense the pressure drops across the restrictors 187, 191.

The position of the plate 173 will thus be controlled by the said pressure drops and therefore by the speed of flow through whichever of the restrictors 187, 191 is at any moment in operation. This will have the effect of altering the position of the movable fulcrum 171 so as to cause the spool valve 170 to be moved back towards its "null" position at a speed proportional to the speed of operation of the control piston 200. Thus, any substantial change in the position of the cross-head 162 causes a substantial change in the position of the spool valve 170 and therefore a quick change in the position of the control piston 200, while the speed of movement of the control piston 200 causes a restoring movement to be imparted to the spool valve 170.

Thus, if, for example, there is an increase in the value $Prp/pL$, which increase occurs because the final shock wave 32 is moving forwardly in the intake 11, the cross-head 162 will be moved downwardly and this will move the spool valve 170 upwardly. This will cause the control piston 200 to move towards the left whereby to effect opening of the spill flap 22 so as to spill air from the intake and thus cause the shock wave 32 to tend to move upstream.

The further the final shock wave 32 moves away from its datum position the faster is the need to adjust its position. It will be appreciated that the velocity feed back provided by the manner in which the fulcrum 171 is adjusted by the flow through restrictors 187, 191, ensures that the greater the error in the position of the final shock wave as sensed by the cross-head 162, the greater will be the initial movement of the spool valve 170 and the greater will be the subsequent flow through the restrictors 187, 191.

In order to minimise the risk of the spool valve 170 sticking, it may be rotated, oscillated, or vibrated, by means not shown.

The arrangement may be such that the control piston 200 is moved at a velocity of 16" per second for an error of one unit of $Prp/pL$ and at approximately proportional proportional velocities at smaller errors.

The connecting rod 203 carries an abutment 260 which is engageable with a slideable sleeve 261. The sleeve 261 is urged towards contact with the abutment 260 by a spring 262.

The sleeve 261 carries spaced abutments 263, 264 which are respectively engageable with valves 265, 266. The valves 265, 266 are urged away from each other by a spring 267, the spring 267 also urging the valves 265, 266 towards their valve seats 270, 271.

The sleeve 261 is movable between a mid-position in which it engages neither of the valves 265, 266, and two further positions in which it respectively engages and effects opening of one or other of these valves.

The valve 265 controls flow from a high pressure passage 272 to a low pressure chamber 273 within which the valves 265, 266 are located, the low pressure chamber 273 communicating by way of the low pressure passage 221 with the low pressure chamber 46. The high pressure passage 272, which contains a filter 274, communicates by way of a restriction 275 and a filter 276 with the high pressure in the main conduit 42.

Similarly the valve 266 controls flow from a high pressure passage 280 to the low pressure chamber 273. The high pressure passage 280, which contains a filter 281, communicates by way of a restriction 282 and a filter 283 with a passage 284 leading to the main conduit 42.

The ram 26 comprises a control piston 285 which is slidably mounted in a cylinder 286. The control piston 285 is provided on its left and right hand sides respectively with pressure surfaces 290, 291 which are of equal areas.

A passage 292 which communicates with the high pressure passage 280 communicates with the left hand end of the cylinder 286 so as to subject the pressure surface 290 to the pressure within the passage 280. A passage 293 communicates with the high pressure passage 272 and also with the right hand end of the cylinder 286 so as to subject the pressure surface 291 to the pressure within the high pressure passage 272.

The control piston 285 is mounted on a piston rod 295 which is pivotally connected to one end of a lever 296. The opposite end of the lever 296 is pivotally connected to an output member 297 which is itself connected so as to effect movement of the dump flap 21. The output member 297 is connected by a rod 298 to a dump monitoring transducer 300 which provides a signal of the position of the dump flap 21.

The arrangement is such that the control piston 285 is maintained adjacent the right hand end of its cylinder 286 until the spill flap 22 is substantially fully opened. When the spill flap 22 is substantially fully opened, the abutment 260 will move the sleeve 261 into the position in which the abutment 264 will force the valve 266 off its seat 271. When this occurs, there will be a fall of pressure in the passage 280 with the result that the control piston 291 will be forced towards the left so as to effect opening of the dump flap 21.

If the dump flap 21 should have been opened more than is required, the various pressures sensed by the crosshead 162 will alter in such a way as to cause the spill flap 22 to start to close. This will permit the valve 266 to be reseated on its seat 271 without at first causing the valve 265 to be lifted away from its seat 270. Accordingly, the dump flap 21 will be maintained in the open position in which it had been previously placed.

If, however, this does not of itself provide sufficient correction and the control piston 200 continues to move the spill flap 22 towards its closed position, the abutment 263 will cause the valve 265 to be lifted off its seat 270 at the same time as the valve 266 will remain seated. This will cause pressure in the passage 272 to fall whereby the pressure to which the pressure surface 291 is subjected will also fall. The control piston 285 will therefore move towards the right whereby to effect closing movement of the dump flap 21.

By suitable sizing of the restrictions 274, 282 (and by suitable sizing of the passages 272, 280) the dump flap 21 may be arranged to open at a substantially greater speed than it closes. Thus the arrangement may be that the dump flap 21 opens at 17° per second when the spill flap 22 is in the 20° position and closes at a rate of 4° per second from an 18° position of the spill flap 22.

The lever 296 has a pivot 301 which is carried by a rod 302 of a ram piston 303. The ram piston 303 is a differential area piston having a larger pressure surface 304 on its left hand side and a smaller pressure surface 305 on its right hand side. The pressure surface 304 is subjected to low pressure through a passage 306 which communicates with the low pressure chamber 273. The pressure surface 305 is subjected to the pressure in a high pressure passage 307 which communicates by way of the restrictor 216 and filter 217 with the high pressure passage 215. A spring 310 also acts on the pressure surface 304.

Accordingly, if the solenoid 227 is opened, the pressure in the passage 307 will fall and the difference in pressure across the ram piston 303 in conjunction with the force of the spring 310 will force the ram piston 305 towards the right whereby to move the pivot 301 to a position 301'. In this position, the dump flap 21 will be maintained in its open position irrespective of what may be the position at that time of the control piston 285.

We claim:

1. Control apparatus comprising fine and coarse control members, first and second rams which are respectively arranged to control the fine and coarse control members, the second ram having a control piston, first and second passages which are adapted to be supplied with a pressure fluid, and which are respectively open to opposite sides of the control piston, first and second vent valves, opening of which respectively causes a reduction of pressure in the first and second passages, a movable member which is movable by the first ram and which has two abutments which are respectively engageable with the first and second vent valves, the movable member being movable between a mid-position in which it engages neither vent valve and two further positions in which it respectively engages and effects opening of a selected vent valve, and means ensuring that, if the first ram is disposed adjacent the end of its travel in the direction in which it makes the fine control member exercise maximum control, it causes the movable member to effect opening of the first vent valve and so bring the coarse control member into operation, if the first ram should thereafter move in the opposite direction the movable member will move to the said mid-position in which the coarse control member will be stationary, and, if the first ram continues to move in the said opposite direction, the movable member will then effect opening of the second vent valve so as to move the coarse control member towards its inoperative position.

2. Control apparatus for controlling operation of a spill flap and a dump flap in a supersonic intake comprising first and second rams which are respectively arranged to control the spill flap and the dump flap, the second ram having a control piston, first and second passages which are adapted to be supplied with a pressure fluid and which are respectively open to opposite sides of the control piston, first and second vent valves opening of which respectively causes a reduction of pressure in the first and second passages, a movable member which is movable by the first ram and which has two abutments which are respectively engageable with the first and second vent valves, the movable member being movable between a mid-position in which it engages neither vent valve and two further positions in which it respectively engages and effects opening of a selected vent valve, and means ensuring that, if the first ram is disposed adjacent the end of its travel in the direction in which it makes the spill flap exercise maximum control, it causes the movable member to effect opening of the first vent valve and so bring the dump flap into operation, if the first ram should thereafter move in the opposite direction the movable member will move to the said mid-position in which the dump flap will be stationary, and, if the first ram continues to move in the said opposite direction, the movable member will then effect opening of the second vent valve so as to move the dump flap towards its inoperative position.

3. Control apparatus as claimed in claim 2 in which the first and second passages communicate with a common pressure fluid source by way of differently sized first and second restrictions respectively, the first and second restrictions causing the dump flap to open at a substantially greater speed than it closes.

4. Control apparatus comprising fine and coarse control members, first and second rams which are respectively arranged to control the fine and coarse control members, the second ram having a control piston, a piston rod connected to the control piston, an output member which is connected to a said control member, a lever spaced parts of which are respectively pivotally connected to the piston rod and to the output member, a movable pivot on which said lever is mounted, the output member being movable by the control piston between two limiting positions, means for sensing the position of the output member, means for moving the movable pivot into and out of a position in which the output member is disposed in a predetermined limiting position irrespective of what may be the position of the control piston, first and second passages which are adapted to be supplied with a pressure fluid and which are respectively open to opposite sides of the control piston, first and second vent valves opening of which respectively causes a reduction of pressure in the first and second passages, a movable member which is movable by the first ram and which has two abutments which are respectively engageable with the first and second vent valves, the movable member being movable between a mid-position in which it engages neither vent valve and two further positions in which it respectively engages and effects opening of a selected vent valve, and means ensuring that, if the first ram is disposed adjacent the end of its travel in the direction in which it makes the fine control member exercise maximum control, it causes the movable member to effect opening of the first vent valve and so bring the coarse control member into operation, if the first ram should thereafter move in the opposite direction the movable member will move to the said mid-position in which the coarse control member will be stationary, and, if the first ram continues to move in the said opposite direction, the movable member will then effect opening of the second vent valve so as to move the coarse control member towards its inoperative position.

5. Control apparatus comprising fine and coarse control members, first and second rams which are respectively arranged to control the fine and coarse control members, the second ram having a control piston, connected to the control piston, an output member which is connected to a said control member, a lever spaced parts of which are respectively pivotally connected to the piston rod and to the output member, a movable pivot on which said lever is mounted, the output member being movable by the control piston between two limiting positions, means for sensing the position of the output member, a ram having a ram piston, means for subjecting opposite sides of the ram piston to first and second pressures which respectively urge the ram piston to maintain the movable pivot away from and in a predetermined limiting position thereof, means for releasing the said first pressure, first and second passages which are adapted to be supplied with a pressure fluid and which are respectively open to opposite sides of the control piston, first and second vent valves opening of which respectively causes a reduction of pressure in the first and second passages, a movable member which is movable by the first ram and which has two abutments which are respectively engageable with the first and second vent valves, the movable member being movable between a mid-position in which it engages neither vent valve and two further positions in which it respectively engages and effects opening of a selected vent valve, and means ensuring that, if the first ram is disposed adjacent the end of its travel in the direction in which it makes the fine control member exercise maximum control, it causes the movable member to effect opening of the first vent valve and so bring the coarse control member into operation, if the first ram should thereafter move in the opposite direction the movable member will move to the said mid-position in which the coarse control member will be stationary, and, if the first ram continues to move in the said opposite direction, the movable member will then effect opening of the second vent valves so as to move the coarse control member towards its inoperative position.

6. Control apparatus as claimed in claim 5 in which the ram piston is a differential area piston having a larger area side exposed to the said second pressure and a smaller area side exposed to the said first pressure.

7. Control apparatus as claimed in claim 6 in which the first and second pressures are fluid pressures, the larger area side of the ram piston also being engaged by a spring.

8. Control apparatus as claimed in claim 5 in which the means for releasing the first pressure comprises a valve which is urged open by a spring and which is closed on energisation of a solenoid.

9. Control apparatus as claimed in claim 5 in which the control piston is provided with oppositely facing pressure surfaces of equal area, there being provided sources of relatively high and relatively low pressure, and a change-over valve for subjecting one pressure surface to a selected one of said pressures and the other pressure surface to the other pressure.

10. Control apparatus comprising fine and coarse control members, first and second rams which are respectively arranged to control the fine and coarse control members, the second ram having a control piston, a change-over valve which controls a supply of pressure fluid to the first ram, variable-responsive means which adjust the position of said change-over valve in dependence upon the value of a variable, feed back means for adjusting the change-over valve back towards a predetermined position at a speed proportional to the speed of operation of the said first ram, first and second passages which are adapted to be supplied with a pressure fluid and which are respectively open to opposite sides of the control piston, first and second vent valves opening of which respectively causes a reduction of pressure in the first and second passages, a movable member which is movable by the first ram and which has two abutments which are respectively engageable with the first and second vent valves, the movable member being movable between a mid-position in which it engages neither vent valve and two further positions in which it respectively engages and effects opening of a selected vent valve, and means ensuring that, if the first ram is disposed adjacent the end of its travel in the direction in which it makes the fine control member exercise maximum control, it causes the movable member to effect opening of the first vent valve and so bring the coarse control member into operation, if the first ram should thereafter move in the opposite direction the movable member will move to the said mid-position in which the coarse control member will be stationary, and, if the first ram continues to move in the said opposite direction, the movable member will then effect opening of the second vent valve so as to move the coarse control member towards its inoperative position.

11. Control apparatus comprising fine and coarse control members, first and second rams which are respectively arranged to control the fine and coarse control members, the second ram having a control piston, first and second pressure fluid ducts respectively communicating with opposite ends of the first ram, high and low pressure ducting, a change-over valve which is movable to connect a selected one of said first and second pressure fluid ducts with the high pressure ducting at the same time as the other of said pressure fluid ducts is connected to the low pressure ducting, variable-responsive means which adjust the position of said change-over valve in dependence upon the value of a variable, feed back means for adjusting the change-over valve back towards a predetermined position at a speed proportional to the speed of operation of the said first ram, first and second passages which are adapted to be supplied with a pressure fluid and which are respectively open to opposite sides of the control piston, first and second vent valves opening of which respectively causes a reduction of pressure in the first and second passages, a movable member which is movable by the first ram and which has two abutments which are respectively engageable with the first and second vent valves, the movable member being movable between a mid-position in which it engages neither vent valves and two further positions in which it respectively engages and effects opening of a selected vent valve, and means ensuring that, if the first ram is disposed adjacent the end of its travel in the direction in which it makes the fine control member exercise maximum control, it causes the movable member to effect opening of the first vent valve and so bring the coarse control member into operation, if the first ram should thereafter move in the opposite direction the movable member will move to the said mid-position in which the coarse control member will be stationary, and, if the first ram continues to move in the said opposite direction, the movable member will then effect opening of the second vent valve so as to move the coarse control member towards its inoperative position.

12. Control apparatus comprising fine and coarse control members, first and second rams which are respectively arranged to control the fine and coarse control members, the second ram having a control piston, first and second pressure fluid ducts respectively communicating with opposite ends of the first ram, high and low pressure ducting, a change-over valve which is movable to connect a selected one of said first and second pressure fluid ducts with the high pressure ducting at the same time as the other of said pressure fluid ducts is connected to the low pressure ducting, variable-responsive means which adjust the position of said change-over valve in dependence upon the value of a variable, feed back means for adjusting the change-over valve back towards a predetermined position at a speed proportional to the speed of operation of the said first ram, at least one restrictor in the low pressure ducting the pressure drop across which is substantially linearly proportional to the speed of flow therethrough, the said feed back means being adjusted by the said pressure drop, first and second passages which are adapted to be supplied with a pressure fluid, and which are respectively open to opposite sides of the control piston, first and second vent valves opening of which respectively causes a reduction of pressure in the first and second passages, a movable member which is movable by the first ram and which has two abutments which are respectively engageable with the first and second vent valves, the movable member being movable between a mid-position in which it engages neither vent valve and two further positions in which it respectively engages and effects opening of a selected vent valve, and means ensuring that, if the first ram is disposed adjacent the end of its travel in the direction in which it makes the fine control member exercise maximum control, it causes the movable member to effect opening of the first vent valve and so bring the coarse control member into operation, if the first ram should thereafter move in the opposite direction the movable member will move to the said mid-position in which the coarse control member will be stationary, and, if the first ram continues to move in the said opposite direction, the movable member will then effect opening of the second vent valve so as to move the coarse control member towards its inoperative position.

13. Control apparatus as claimed in claim 12 in which the variable responsive means are connected to the change-over valve by a linkage which includes a lever arm having a movable fulcrum, the feed back means adjusting the position of the fulcrum.

14. Control apparatus as claimed in claim 13 in which the low pressure ducting comprises two low pressure ducts each of which has a said restrictor therein, a cam mechanism being provided for effecting adjustment of said movable fulcrum, said cam mechanism being positioned by the relative pressure drops at any moment across the two restrictors.

15. Control apparatus for controlling operation of a spill flap and a dump flap in a supersonic intake comprising first and second rams which are respectively arranged to control the spill flap and the dump flap, the second ram having a control piston, a change-over valve which controls the supply of pressure fluid to the first ram, shock wave responsive means which adjust the position of said change-over valve in dependence upon the position of a final shock wave in the intake, feed back means being provided for adjusting the change-over valve back towards a predetermined position at a speed proportional to the speed of operation of said first ram, first and second passages which are adapted to be supplied with a pressure fluid, and which are respectively open to opposite sides of the control piston, first and second vent valves opening of which respectively causes a reduction of pressure in the first and second passages, a movable member which is movable by the first ram and which has two abutments which are respectively engageable with the first and second vent valves, the movable member being movable between a mid-position in which it engages neither vent valve and two further positions in which it respectively engages and effects opening of a selected vent valve, and means ensuring that, if the first ram is disposed adjacent the end of its travel in the direction in which it makes the spill flap exercise maximum control, it causes the movable member to effect opening of the first vent valve and so bring the dump flap into operation, if the first ram should thereafter move in the opposite direction the movable member will move to the said mid-position in the which the dump flap will be stationary, and, if the first ram continues to move in the said opposite direction, the movable member will then effect opening of the second vent valves so as to move the dump flap towards its inoperative position.

16. Control apparatus as claimed in claim 15 in which the shock wave responsive means are connected to the change-over valve by a linkage which includes a lever arm having a movable fulcrum, the feed back means adjusting the position of the fulcrum.

17. Control apparatus as claimed in claim 16 in which the shock wave responsive means comprises first positioning means for positioning a first member in dependence upon the quotient of reverse pitot pressure and local pitot pressure, second positioning means for positioning a second member in dependence upon the quotient of local pitot pressure and local static pressure, and a third member which is connected to the said linkage and which is also connected to the said first and second members through the intermediary of cams.

18. Control apparatus as claimed in claim 17 in which each of the first and second positioning means comprises an L-shaped beam having a movable fulcrum, the arms of each respective beam being respectively subjected to the respective pressure whose quotient is to be obtained, the pressures subjecting the respective beam to moments of opposite sense, and means connected to the respective member for adjusting the position of the movable fulcrum of the respective beam to produce equilibrium thereof.

19. Control apparatus as claimed in claim 18 in which the second positioning means controls the positions of parts of a ramp, the said ramp forming part of the said intake.

References Cited by the Examiner

UNITED STATES PATENTS

| | | | |
|---|---|---|---|
| 2,044,777 | 6/1936 | Erling | 91—48 |
| 2,445,081 | 7/1948 | Pouille | 91—189 |
| 3,067,578 | 12/1962 | Goodall | 60—35.6 |

FOREIGN PATENTS

| | | |
|---|---|---|
| 723,671 | 1/1932 | France. |

MARK NEWMAN, *Primary Examiner.*

R. D. BLAKESLEE, *Assistant Examiner.*